(12) United States Patent
Si

(10) Patent No.: US 11,903,020 B2
(45) Date of Patent: Feb. 13, 2024

(54) CHANNEL ACCESS REQUEST IN A DOWNLINK TRANSMISSION

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/305,509

(22) Filed: Jul. 8, 2021

(65) Prior Publication Data

US 2022/0030622 A1     Jan. 27, 2022

Related U.S. Application Data

(60) Provisional application No. 63/139,120, filed on Jan. 19, 2021, provisional application No. 63/056,232, filed on Jul. 24, 2020.

(51) Int. Cl.
| | |
|---|---|
| H04W 74/00 | (2009.01) |
| H04W 16/14 | (2009.01) |
| H04W 74/08 | (2009.01) |
| H04W 72/23 | (2023.01) |

(52) U.S. Cl.
CPC ......... H04W 74/006 (2013.01); H04W 16/14 (2013.01); H04W 72/23 (2023.01); H04W 74/0808 (2013.01)

(58) Field of Classification Search
CPC ... H04W 74/006; H04W 16/14; H04W 72/23; H04W 74/0808; H04B 7/088
See application file for complete search history.

(56) References Cited

U.S. PATENT DOCUMENTS

| | | | |
|---|---|---|---|
| 11,140,708 B2 | 10/2021 | Li et al. | |
| 2019/0373635 A1 | 12/2019 | Yang et al. | |
| 2020/0037354 A1 | 1/2020 | Li et al. | |
| 2020/0092913 A1* | 3/2020 | Xu | H04W 74/0816 |
| 2021/0259015 A1* | 8/2021 | Wang | H04W 74/0808 |

(Continued)

FOREIGN PATENT DOCUMENTS

| | | |
|---|---|---|
| KR | 20200085772 A | 7/2020 |
| WO | 2019237832 A1 | 12/2019 |

(Continued)

OTHER PUBLICATIONS

Cao et al., "Electronic device and method for wireless communication, and computer-readable storage medium", Oct. 14, 2021, WO, WO 2021204074. (Year: 2021).*

(Continued)

*Primary Examiner* — Michael K Phillips

(57) ABSTRACT

Apparatuses and methods for channel access requests in downlink transmissions. A method of operating a user equipment (UE) includes receiving, from a base station (BS), a downlink control information (DCI) format in physical downlink control channels (PDCCHs), determining a number of beam directions to sense, and determining a number of channel access request (CARQs) in a burst. The method further includes determining, based on at least one field in the DCI format, a set of CARQs according to the number of CARQs in the burst and a set of beam directions according to the number of beam directions to sense.

19 Claims, 7 Drawing Sheets

(56) References Cited

U.S. PATENT DOCUMENTS

2021/0400667 A1 12/2021 Wei et al.
2022/0346126 A1* 10/2022 Li .................... H04L 5/0094

FOREIGN PATENT DOCUMENTS

WO 2020027533 A1 2/2020
WO WO-2021204074 A1 * 10/2021

OTHER PUBLICATIONS

International Search Report of the International Searching Authority in connection with International Application No. PCT/KR2021/009375 dated Oct. 21, 2021, 3 pages.
Samsung, "Channel access mechanism for 60 GHz unlicensed spectrum", 3GPP TSG RAN WG1 #101, R1-2003904, e-Meeting, May 25-Jun. 5, 2020, 3 pages.
Vivo, "Discussion on channel access mechanism", 3GPP TSG RAN WG1 #101, R1-2003425, e-Meeting, May 25-Jun. 5, 2020, 6 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report dated Oct. 27, 2023 regarding Application No. 21846093.9, 10 pages.
Samsung, "Channel access procedures for NR-U", 3GPP TSG-RAN WG1 Meeting #99, R1-1912449, Nov. 2019, 13 pages.

* cited by examiner

CHANNEL ACCESS REQUEST IN A DOWNLINK TRANSMISSION

CROSS-REFERENCE TO RELATED APPLICATIONS AND CLAIM OF PRIORITY

The present application claims priority to U.S. Provisional Patent Application No. 63/056,232, filed on Jul. 24, 2020 and U.S. Provisional Patent Application No. 63/139,120, filed on Jan. 19, 2021. The content of the above-identified patent document is incorporated herein by reference.

TECHNICAL FIELD

The present disclosure relates generally to wireless communication systems and, more specifically, the present disclosure relates to a channel access request in a downlink transmission.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a channel access request in a downlink transmission.

In one embodiment, a base station (BS) in a wireless communication system including a carrier operating with shared spectrum channel access is provided. The BS includes a processor configured to determine a number of beam directions to sense, determine a number of channel access requests (CARQs) in a burst, and determine at least one field in a downlink control information (DCI) format. The at least one field indicates a set of CARQs according to the number of CARQs in the burst and a set of beam directions according to the number of beam directions to sense. The BS further includes a transceiver operably connected to the processor. The transceiver configured to transmit, to a user equipment (UE), the DCI format including the at least one field in physical downlink control channels (PDCCHs).

In another embodiment, a UE in a wireless communication system is provided. The UE includes a transceiver configured to receive, from a BS, a DCI format in PDCCHs and a processor operably connected to the transceiver. The processor is configured to determine a number of beam directions to sense, determine a number of CARQs in a burst, and determine, based on at least one field in the DCI format, a set of CARQs according to the number of CARQs in the burst and a set of beam directions according to the number of beam directions to sense.

In yet another embodiment, a method of operating a UE in a wireless communication system is provided. The method includes receiving, from a BS, a DCI format in PDCCHs, determining a number of beam directions to sense, and determining a number of CARQs in a burst. The method further includes determining, based on at least one field in the DCI format, a set of CARQs according to the number of CARQs in the burst and a set of beam directions according to the number of beam directions to sense.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

Figure 1:
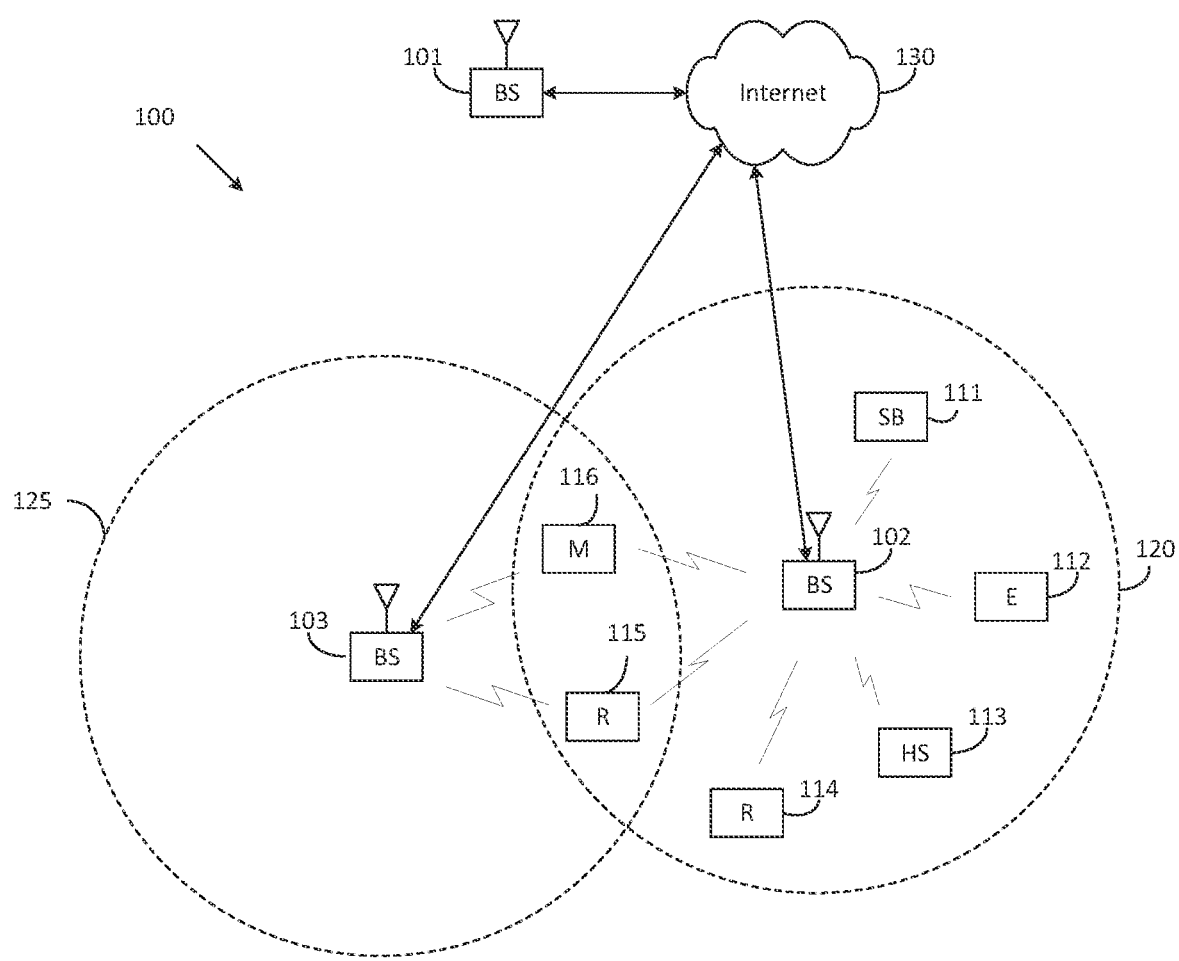
FIG. 1 illustrates an example wireless network according to various embodiments of the present disclosure.
Figure 2:
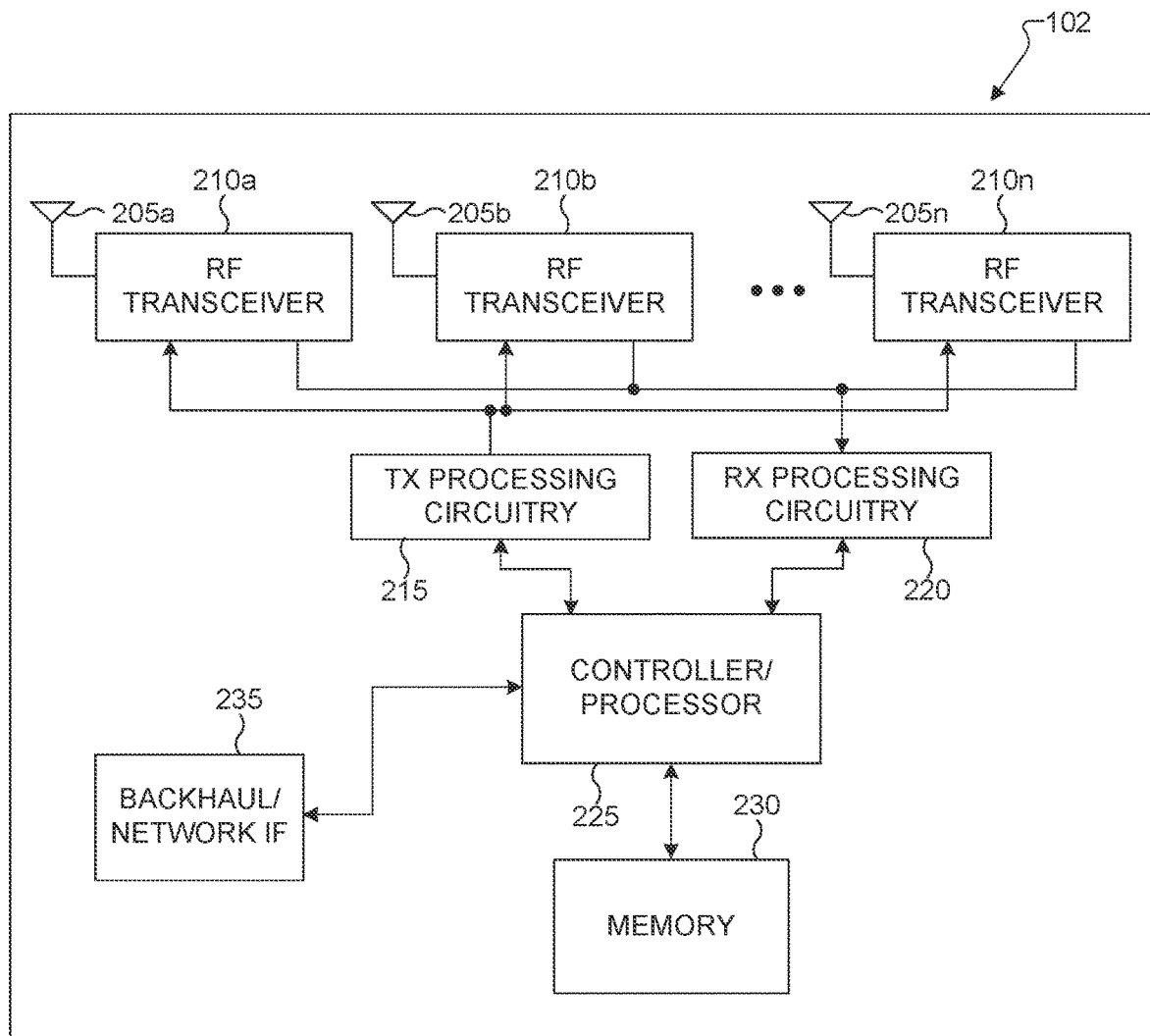
FIG. 2 illustrates an example gNB according to various embodiments of the present disclosure.
Figure 3:
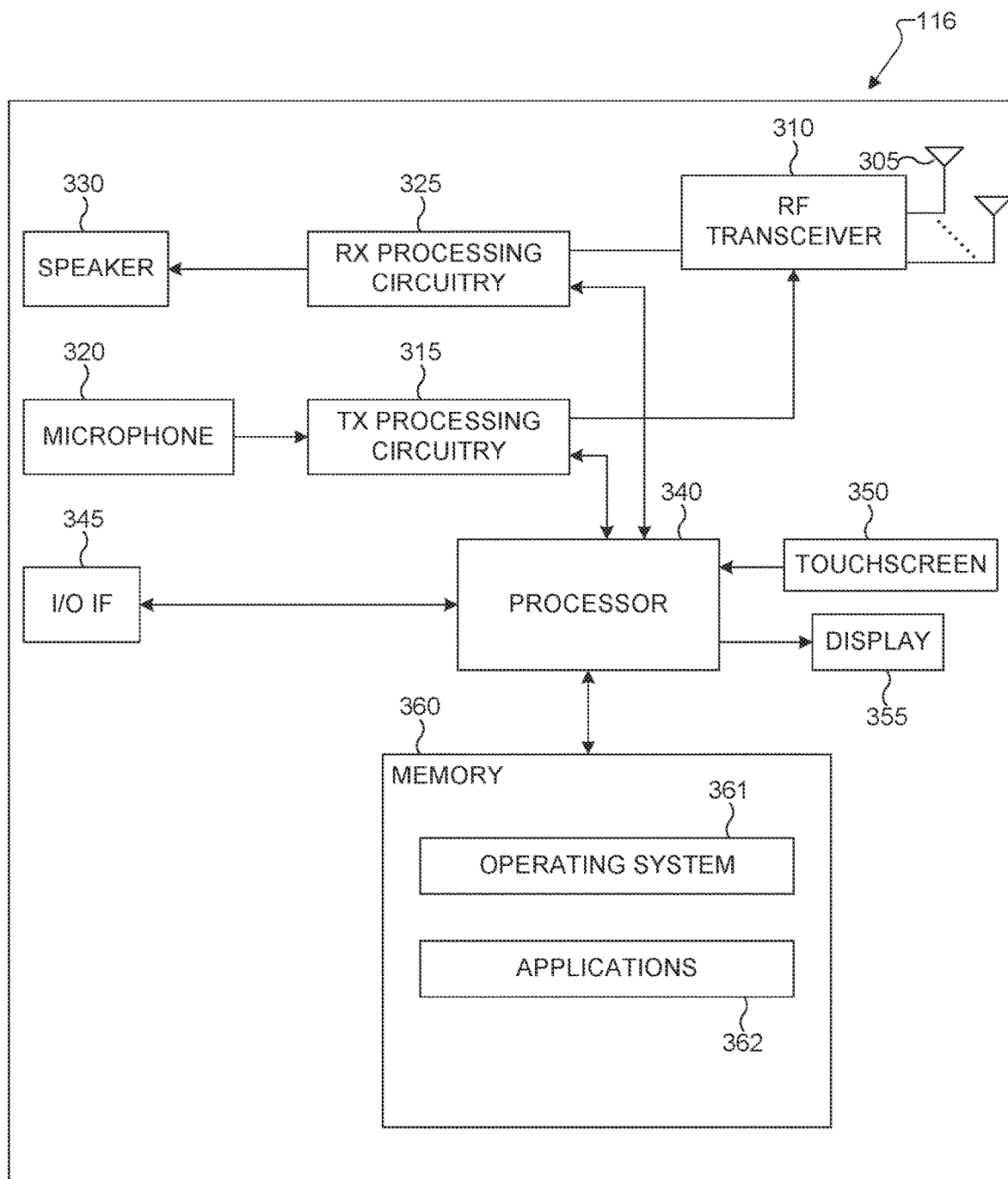
FIG. 3 illustrates an example UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a channel access request in downlink transmission. In certain embodiments, and one or more of the gNBs 101-103 includes circuitry, programing, or a combination thereof, for a channel access request in downlink transmission.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a channel access request in downlink transmission. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
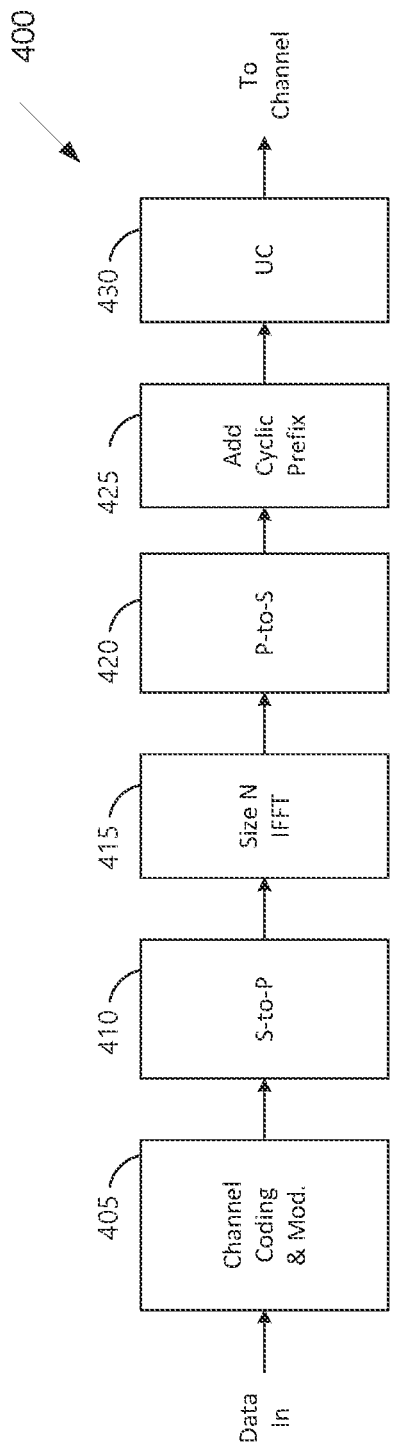
FIGS. 4 and 5 illustrate example wireless transmit and receive paths according to various embodiments of the present disclosure.
Figure 5:
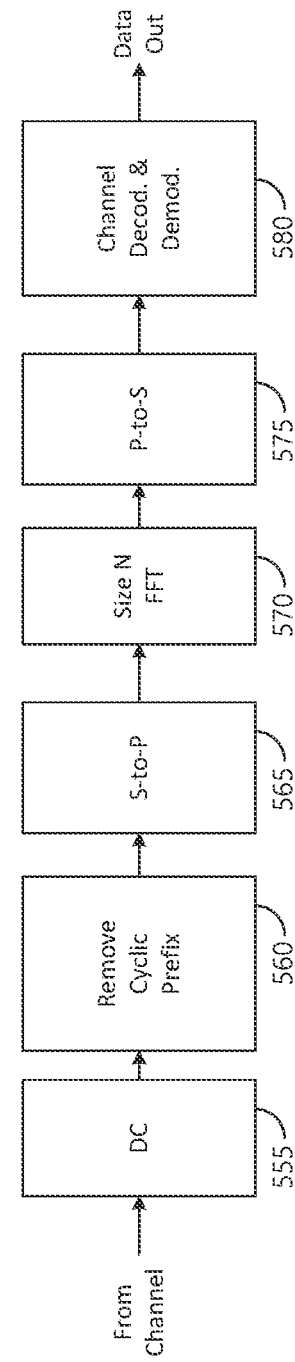

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the design of channel access request in a directional transmission. General aspects of the feature for channel access request (CARQ), as well as the physical layer design for the CARQ are covered. More precisely, the following components are included in the present disclosure.

In the present disclosure, a new DCI based CARQ is provided, a GC-PDCCH based CARQ is provided, a PDCCH+PDSCH based CARQ is provided, and an RS based CARQ is provided.

In NR Rel-16, operation with shared spectrum channel access has been supported for 5 GHz unlicensed band and 6 GHz unlicensed band. More precisely, two types of channel access procedures are supported, wherein Type 1 channel access procedure includes a random time duration of channel sensing before a downlink transmission, and Type 2 channel access procedure includes a deterministic time duration (e.g., including zero duration) of channel sensing before a downlink transmission.

For higher carrier frequency range, for example 60 GHz unlicensed spectrum, transmissions may utilize highly-directional beamforming. To support this, the corresponding channel sensing could also be configured to be highly-directional, in order to save sensing energy on directions not related to the intended transmission, wherein the new type of sensing is referred to as directional channel sensing, to be distinguished from classical omni-directional channel sensing. However, in directional channel sensing, the antenna direction for sensing the channel is not aligned with the direction for transmission. I other words, the direction for sensing is opposite to the direction for transmission, so the interference situation in the sensing procedure is not aligned with the actual interference situation when transmitting. This mismatch may cause issue with performance degradation, and the present disclosure is focusing on resolving the mismatch issue by using a CARQ in the downlink transmission.

Although exemplary descriptions and embodiments to follow assume OFDM or OFDMA, the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

In one embodiment, a CARQ can be used for requesting the occupancy of a channel, wherein the channel can be a downlink channel for example, and the CARQ is transmitted by the gNB.

Figure 6:
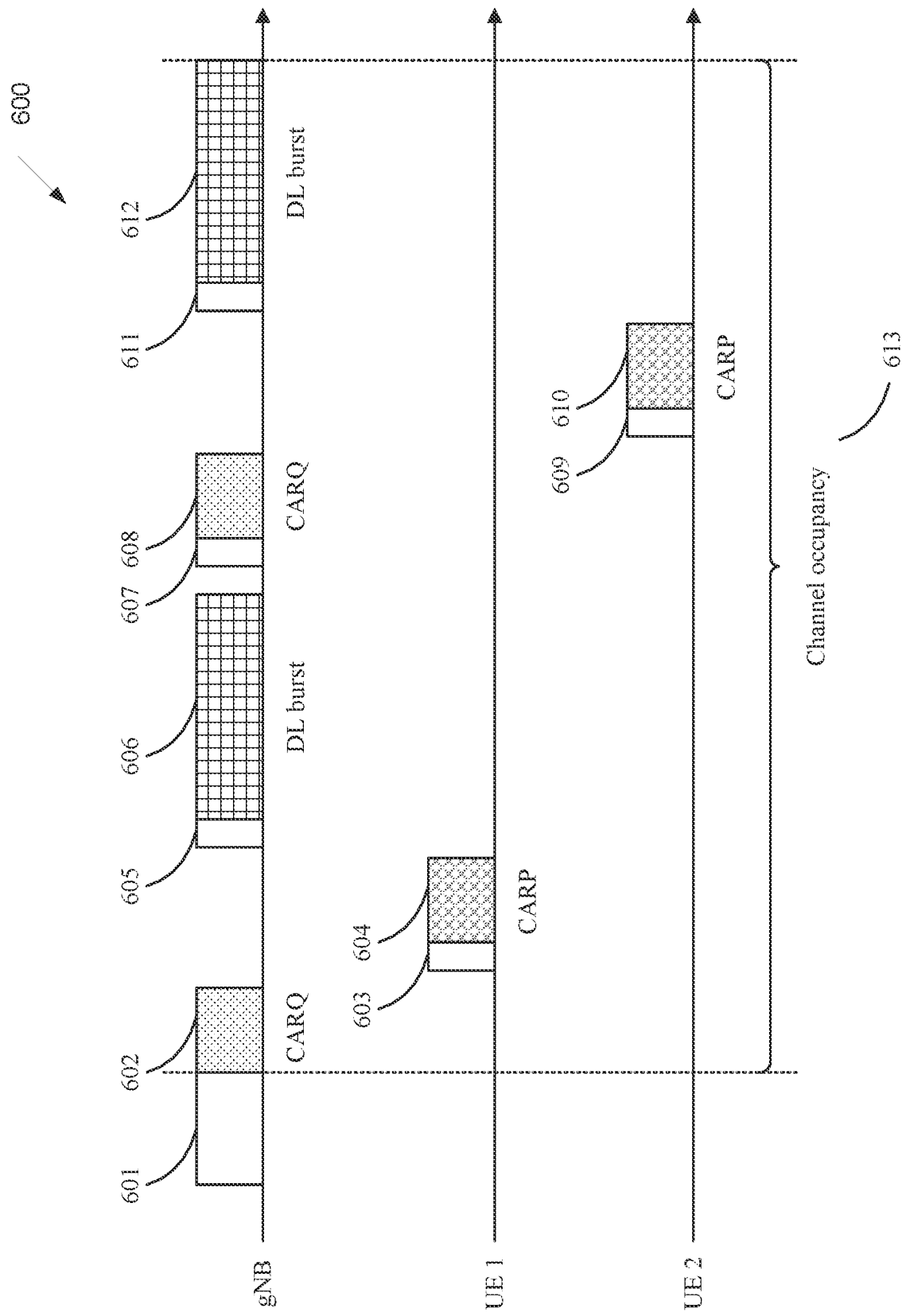
FIG. 6 illustrates an example CARQ according to various embodiments of the present disclosure.

FIG. 6 illustrates an example CARQ 600 according to embodiments of the present disclosure. An embodiment of the CARQ 600 shown in FIG. 6 is for illustration only.

In one example, the CARQ can be sent at the beginning of a gNB's initialized channel occupancy, as illustrated as 602 of FIG. 6, after the channel sensing procedure (601 as illustrated in FIG. 6) associated with the channel occupancy initialized by the gNB (613 in FIG. 6).

In another example, the CARQ can be sent within a gNB's initialized channel occupancy, as illustrated in 608 of FIG. 6, after a potential channel sensing procedure (607 in FIG. 6).

Figure 7:
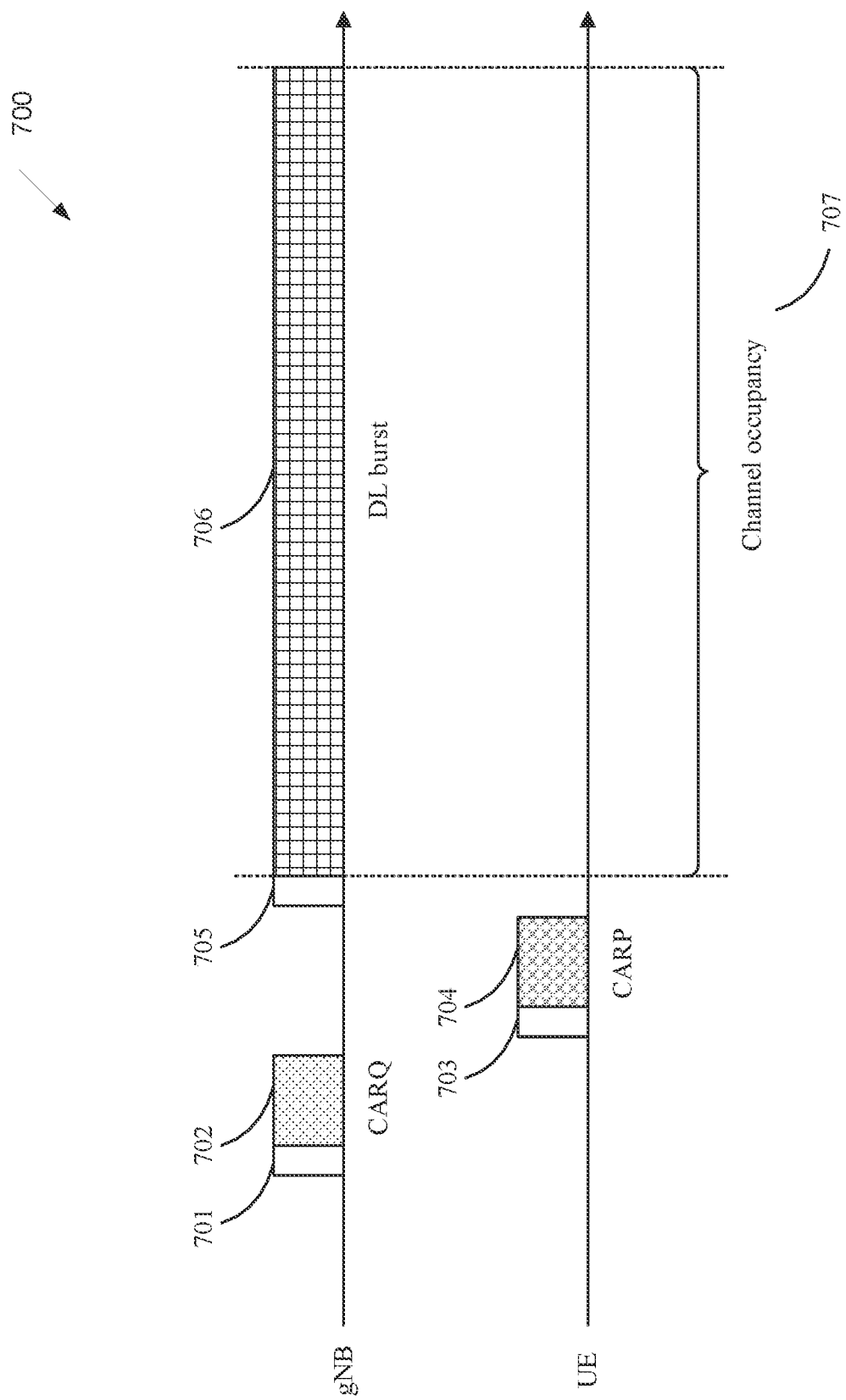
FIG. 7 illustrates another example CARQ according to various embodiments of the present disclosure.

FIG. 7 illustrates another example CARQ 700 according to embodiments of the present disclosure. An embodiment of the CARQ 700 shown in FIG. 7 is for illustration only.

In yet another example, the CARQ can be sent outside a gNB's initialized channel occupancy, as illustrated in 702 of FIG. 7, after the channel sensing procedure (701 in FIG. 7) associated with the CARQ.

In one example, a CARQ can be associated with at least one channel access response (CARP) sent by the UE addressed in the CARQ (e.g., 604 and 610 in FIG. 6, or 704 in FIG. 7), wherein the CARP includes report of the channel sensing results for the beam directions included in the CARQ, and the gNB can only initialize the DL burst transmissions (e.g., 606 and 612 in FIG. 6, or 706 in FIG. 7) after the CARP declares the channel as available for transmission from the UE side. The declaration of the channel as available for transmission can be based on at least one of an energy detection based channel sensing, a RRM measurement including RSRP/RSRQ, a RSSI measurement, or a CSI measurement.

In another example, the antenna configuration for sensing before the transmission of CARQ (e.g., 601 and 607 in FIG. 6, or 701 in FIG. 7) may be the same as the antenna configuration for transmitting the corresponding CARQ. In yet another example, the antenna configuration for transmitting the CARQ may be the same as the antenna configuration for transmitting the corresponding DL transmission.

Figure 8:
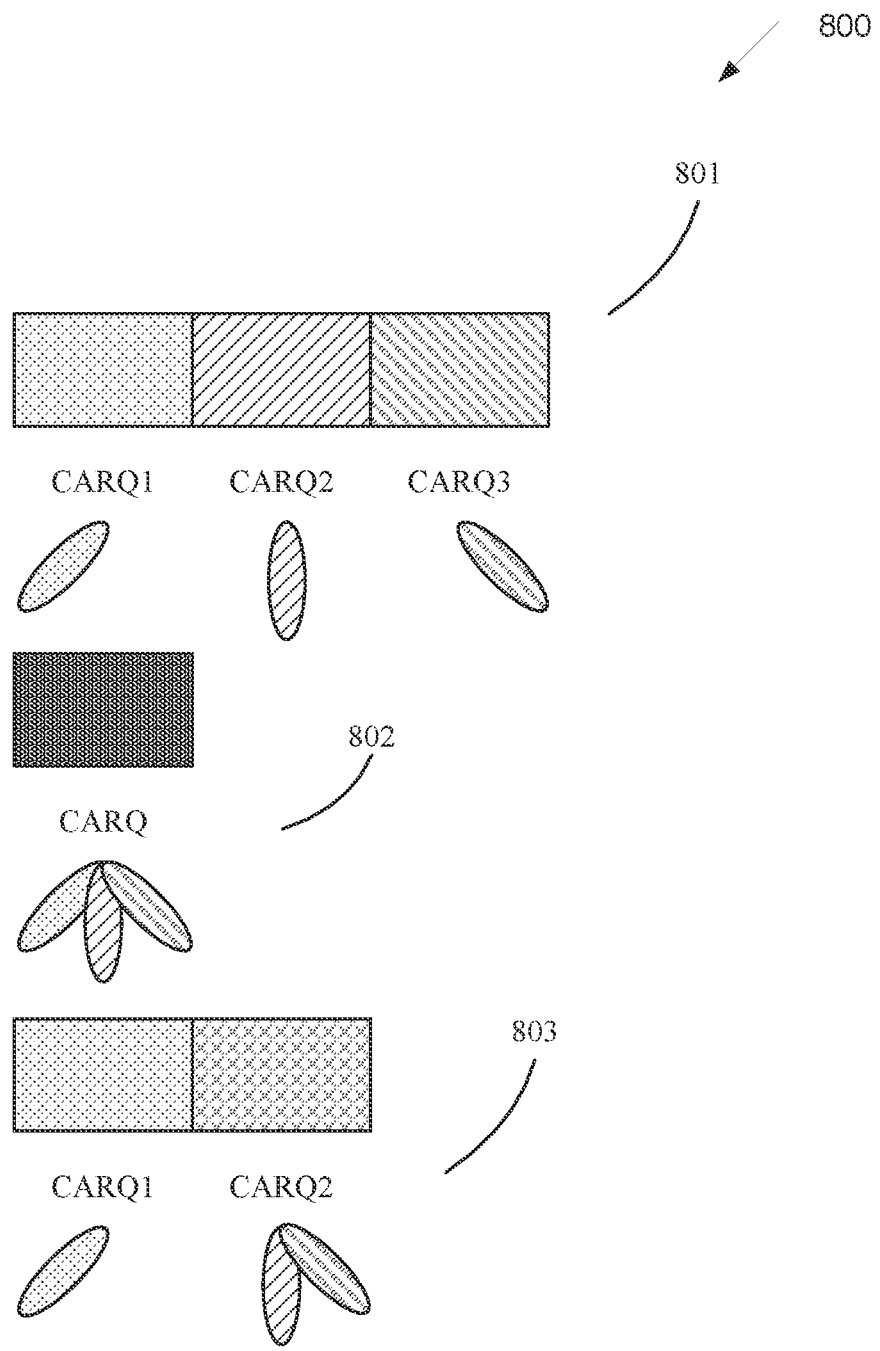
FIG. 8 illustrates an example CARQ transmission according to various embodiments of the present disclosure.

FIG. 8 illustrates an example CARQ transmission 800 according to embodiments of the present disclosure. An embodiment of the CARQ transmission 800 shown in FIG. 8 is for illustration only.

In one instance, one CARQ can include one beam direction to request for a channel access, and the transmission of the CARQ is based on a burst of CARQ to request a channel access from multiple beam directions (as shown in 801 of FIG. 8).

In another instance, one CARQ can include all the beam directions to request for a channel access, and the channel access request for all the beam directions is contained in a single CARQ transmitted by the gNB (as shown in 802 of FIG. 8).

In yet another instance, one CARQ can include one or multiple beam directions to request for a channel access, and the channel access request for all the beam directions can be included in one or multiple CARQs (as shown in 803 of FIG. 8).

For the beam direction included in the CARQ, at least one of the following examples can be utilized. In one example, the CARQ can include an indication of a list of at least one transmission configuration indicator (TCI) state associated with the PDSCH in the corresponding DL burst. In one instance, the number of TCI states in the list included in the CARQ can be configurable by the higher layer parameter. In another instance, the number of TCI states in the list includes in the CARQ can be fixed in the specification.

In another example, the CARQ can include an indication of a bitmap with the length of all the TCI states. A bit in the bitmap corresponds to one TCI state associated with a PDSCH in the corresponding DL burst, and the bit taking value of 1 indicates a channel access request for the corresponding TCI state. In one instance, the size of the bitmap can be configurable by the higher layer parameter, e.g., which equals the number of all TCI states. In another instance, the size of the bitmap can be fixed in the specification.

In yet another example, the CARQ includes an indication of a bitmap with length of maximum number of SS/PBCH block indexes in a cell. A bit in the bitmap corresponds to one SS/PBCH block index, and the bit taking value of 1 indicates a channel access request for the transmission QCLed with the SS/PBCH block with an index corresponding to the bit in the bitmap.

In one example, the support of the CARQ functionality can be a UE capability. In one example, the support of the CARQ functionality is only for RRC_CONNECTED UEs.

In one embodiment, a CARQ is transmitted in a dynamic way. For example, the CARQ can be associated with at least one channel occupancy.

In one embodiment, the CARQ is included in a DCI format, and carried by a PDCCH. For one example, the DCI format can be 1_0. In another example, the DCI format can be 1_1. In yet another example, the DCI format can be 1_2. In yet another example, the DCI format can be 2_0. In yet another example, the DCI format can be a new DCI format.

In one example, at least one of the following components (e.g., as a field in the DCI format) is included in the DCI format including the CARQ: a field of RNTI, representing the ID for receiving the CARQ; a field indicating the beam direction(s) for transmitting the CARQ, wherein the indication method is according to the mentioned embodiments/examples in the present disclosure; a time duration indicating the channel occupancy of the gNB; an ID of the CARQ when multiple CARQs are transmitted in a burst; a time domain gap defining the time difference between the slot including the CARQ and the slot including CARP(s) associated with the CARQ; a time domain resource allocation for the CARP(s) associated with the CARQ; a frequency domain resource indication for the CARP(s) associated with the CARQ; or information related to channel access procedure, e.g., channel access type and/or CP extension and/or contention window size and/or backoff counter size for operation with a cell with shared spectrum channel access for the transmission of CARP(s) associated with the CARQ.

In one example, the DCI format can be with CRC scrambled by the RNTI addressed to the UE to receive the CARQ, and the DCI format includes: (1) if a higher layer parameter configures a number N of beam directions to sense in the CARQ, beam direction 1, . . . beam direction N; (2) if a higher layer parameter configures a number M of CARQ within a burst, an index of the CARQ within the M CARQs in the burst; (3) if a higher layer parameter configures a number L of durations per cell, COT duration indicator 1, . . . , COT duration indicator L; (4) if a higher layer parameter configures a number K of CARPs associated with the CARQ, (i) time and frequency domain resource for CARP #1, . . . , time and frequency domain resource for CARP #K, and (ii) information related to channel access procedure for CARP #1, . . . , channel access type and CP extension for CARP #K.

In another example, the DCI format can be with CRC scrambled by the RNTI addressed to the UE to receive the CARQ, and the DCI format includes: (1) if a higher layer parameter configures a number N of beam directions to sense in the CARQ, beam direction 1, . . . beam direction N; (2) if a higher layer parameter configures a number M of CARQ within a burst, an index of the CARQ within the M CARQs in the burst; (3) if a higher layer parameter configures a number L of durations per cell, COT duration indicator 1, . . . , COT duration indicator L; and (4) if one CARP is associated with the CARQ, (i) time and frequency domain resource for the CARP, (ii) information related to channel access procedure for the CARP.

In yet another example, the DCI format can be with CRC scrambled by the RNTI addressed to the UE to receive the CARQ, and the DCI format includes: (1) if a higher layer parameter configures a number N of beam directions to sense in the CARQ, beam direction 1, . . . beam direction N; (2) if a higher layer parameter configures a number L of durations per cell, COT duration indicator 1, . . . , COT duration indicator L, (3) if a higher layer parameter configures a number K of CARPs associated with the CARQ, (i) time and frequency domain resource for CARP #1, . . . , time and frequency domain resource for CARP #K, and/or (ii) information related to channel access procedure for CARP #1, . . . , channel access type and CP extension for CARP #K.

In yet another example, the DCI format can be with CRC scrambled by the RNTI addressed to the UE to receive the CARQ, and the DCI format includes: (1) if a higher layer parameter configures a number N of beam directions to sense in the CARQ, beam direction 1, . . . Beam direction N, (2) if a higher layer parameter configures a number L of durations per cell, COT duration indicator 1, . . . , COT duration indicator L; (3) if one CARP is associated with the CARQ, (i) time and frequency domain resource for the CARP, and/or (ii) information related to channel access procedure for the CARP.

In yet another example, the DCI format can be with CRC scrambled by the RNTI addressed to the UE to receive the CARQ, and the DCI format includes: (1) if a higher layer parameter configures a number N of beam directions to sense in the CARQ, beam direction 1, . . . beam direction N; and (2) if a higher layer parameter configures a number L of durations per cell, COT duration indicator 1, . . . , COT duration indicator L.

In yet another example, the DCI format can be with CRC scrambled by the RNTI addressed to the UE to receive the CARQ, and the DCI format includes: (1) one beam direction to sense in the CARQ (e.g., beam direction 1); and (2) one duration per cell (e.g., COT duration indicator 1).

In yet another example, the DCI format can be with CRC scrambled by the RNTI addressed to the UE to receive the CARQ, and the DCI format includes one beam direction to sense in the CARQ (e.g., beam direction 1).

In one example, the COT duration indicator has a one-to-one mapping with the beam direction to be sensed, e.g., N=L. In another example, the beam direction to be sensed has a one-to-one mapping with the a CARQ in the burst, e.g. M=N.

In another embodiment, the CARQ is included in the DCI format 2_0 and carried by a group common PDCCH (GC-PDCCH).

In one example, at least one of the following components (e.g., as a field in the DCI format) is included in the DCI format 2_0, in addition to currently included fields in the DCI format 2_0, or reinterpreting exiting fields in the DCI format 2_0: (1) a field indicating the beam direction(s) for transmitting the CARQ, wherein the indication method is according to the mentioned examples/embodiments in the present disclosure; (2) an ID of the CARQ when multiple CARQs are transmitted in a burst; (3) a time domain gap defining the time difference between the slot including the CARQ and the slot including CARP(s) associated with the CARQ; (4) a time domain resource allocation for the CARP(s) associated with the CARQ; (5) a frequency domain resource indication for the CARP(s) associated with the CARQ; and/or (6) information related to channel access procedure, e.g., channel access type and/or CP extension and/or contention window size and/or backoff counter size for operation with a cell with shared spectrum channel access for the transmission of CARP(s) associated with the CARQ.

In one example, the DCI format 2_0 can be with CRC scrambled by the SFI-RNTI, and includes at least one of the following new fields comparing to existing fields in Rel-16: (1) if a higher layer parameter configures a number N of beam directions to sense in the CARQ, beam direction 1, . . . beam direction N; (2) if a higher layer parameter configures a number M of CARQ within a burst, an index of the CARQ within the M CARQs in the burst; (3 if a higher layer parameter configures a number K of CARPs associated with the CARQ, (i) time and frequency domain resource for CARP #1, . . . , time and frequency domain resource for CARP #K; and/or (ii) information related to channel access procedure for CARP #1, . . . , channel access type and CP extension for CARP #K.

In another example, the DCI format 2_0 can be with CRC scrambled by the SFI-RNTI, and includes at least one of the following new fields comparing to existing fields in Rel-16: (1) if a higher layer parameter configures a number N of beam directions to sense in the CARQ, beam direction 1, . . . beam direction N; (2) if a higher layer parameter configures a number M of CARQ within a burst, an index of the CARQ within the M CARQs in the burst; (3) if one CARP is associated with the CARQ, (i) time and frequency domain resource for the CARP; and/or (ii) information related to channel access procedure for the CARP.

In yet another example, the DCI format 2_0 can be with CRC scrambled by the SFI-RNTI, and includes at least one of the following new fields comparing to existing fields in Rel-16: (1) if a higher layer parameter configures a number N of beam directions to sense in the CARQ, beam direction 1, . . . beam direction N; (2) if a higher layer parameter configures a number K of CARPs associated with the CARQ, (i) time and frequency domain resource for CARP #1, . . . , time and frequency domain resource for CARP #K; and/or (ii) information related to channel access procedure for CARP #1, . . . , channel access type and CP extension for CARP #K.

In yet another example, the DCI format 2_0 can be with CRC scrambled by the SFI-RNTI, and includes at least one of the following new fields comparing to existing fields in Rel-16: (1) if a higher layer parameter configures a number N of beam directions to sense in the CARQ, beam direction 1, . . . beam direction N; and (2) if one CARP is associated with the CARQ, (i) time and frequency domain resource for the CARP; and/or (ii) channel access type and CP extension for the CARP.

In another embodiment, the CARQ is included in a message of a transport block carried by a PDSCH, and the PDSCH is scheduled by an associated PDCCH.

In one example, at least one of the following components (e.g., as a field in a message of a transport block carried by a PDSCH) is included in a message of a transport block carried by a PDSCH: (1) a field indicating the beam direction(s) for transmitting the CARQ, wherein the indication method is according to the mentioned embodiments/examples in the present disclosure; (2) an ID of the CARQ when multiple CARQs are transmitted in a burst; (3) a time domain gap defining the time difference between the slot including the CARQ and the slot including CARP(s) associated with the CARQ; (4) a time domain resource allocation for the CARP(s) associated with the CARQ; (5) a frequency domain resource indication for the CARP(s) associated with the CARQ; and/or (6) information related to channel access procedure, e.g., channel access type and/or CP extension and/or contention window size and/or backoff counter size for operation with a cell with shared spectrum channel access for the transmission of CARP(s) associated with the CARQ.

In another embodiment, the CARQ is included in a downlink signal, e.g., a downlink reference signal.

In one example, at least one of the following components is utilized to construct the downlink signal to carry CARQ: (1) an RNTI, representing the ID for receiving the CARQ; (2) an indication of the beam direction(s) for transmitting the CARQ, wherein the indication method is according to the mentioned embodiments/examples in the present disclosure; (3) an ID of the CARQ when multiple CARQs are transmitted in a burst; and/or (4) an index indicating the timing of the RS, e.g., a slot index and/or symbol index.

In one example, the downlink signal is constructed by a pseudo random sequence with an initial condition includes a RNTI resenting the ID for receiving the CARQ, an index of one beam direction for channel access request (e.g., an index of the TCI state), and an index of the CARQ within a burst of CARQs when multiple CARQs in a burst are configured.

In one sub-example, the initial condition can be determined as $c_{init}=C_1 \cdot (N_{RNTI}+1) \cdot (I_{CARQ}+1)+C_2 \cdot (N_{RNTI}+1)+C_3 I_{beam}$, where $N_{RNTI}$ is the RNTI resenting the ID for receiving the CARQ, $I_{CARQ}$ is the index of CARQ within a burst of CARQs, and $I_{beam}$ is the index of one beam direction for channel access request.

In another sub-example, the initial condition can be determined as $c_{init}=C_1 \cdot (N_{RNTI}+1) \cdot (I_{CARQ}+1)+C_2 \cdot (I_{CARQ}+1)+C_3 \cdot I_{beam}$, where $N_{RNTI}$ is the RNTI resenting the ID for receiving the CARQ, $I_{CARQ}$ is the index of CARQ within a burst of CARQs, and $I_{beam}$ is the index of one beam direction for channel access request.

In another example, the downlink signal is constructed by a pseudo random sequence with an initial condition includes a RNTI resenting the ID for receiving the CARQ, and an index of one beam direction for channel access request (e.g., an index of the TCI state).

In one sub-example, the initial condition can be determined as $c_{init}=C_1 \cdot (N_{RNTI}+1) \cdot (I_{beam}+1)+C_2 \cdot (N_{RNTI}+1)$, where $N_{RNTI}$ is the RNTI resenting the ID for receiving the CARQ, and $I_{beam}$ is the index of one beam direction for channel access request.

In another sub-example, the initial condition can be determined as $c_{init}=C_1 \cdot (N_{RNTI}+1) \cdot (I_{beam}+1)+C_2 \cdot (I_{beam}+1)$, where $N_{RNTI}$ is the RNTI resenting the ID for receiving the CARQ, and $I_{beam}$ is the index of one beam direction for channel access request.

In yet another example, the downlink signal is constructed by a pseudo random sequence with an initial condition includes a RNTI resenting the ID for receiving the CARQ, and an index indicating the timing of the RS (e.g., a slot index and/or symbol index).

In one sub-example, the initial condition can be determined as $c_{init}=C_1 \cdot (N_{RNTI}+1) \cdot (I_t+1)+C_2 \cdot (N_{RNTI}+1)$, where $N_{RNTI}$ is the RNTI resenting the ID for receiving the CARQ, and $I_t$ is an index indicating the timing of the RS (e.g., a slot index and/or symbol index).

For another sub-example, the initial condition can be determined as $c_{init}=C_1 \cdot (N_{RNTI}+1) \cdot (I_t+1)+C_2 \cdot (I_t+1)$, where $N_{RNTI}$ is the RNTI resenting the ID for receiving the CARQ, and $I_t$ is an index indicating the timing of the RS (e.g., a slot index and/or symbol index).

In one embodiment, CARQ is transmitted in a semi-static way. For example, CARQ can be associated with a RRC configuration or a MAC CE and be applicable to multiple channel occupancies.

In one embodiment, CARQ is included as part of RRC parameter and configured to a UE. In one example, at least one of the following components (e.g., as a field in the RRC parameter) is included: (1) a field indicating the beam direction(s) requiring the UE to sense, wherein the indication method is according to the mentioned examples/embodiments in the disclosure; (2) a time domain resource allocation for UE to feedback the CARP(s) associated with the CARQ; or (3) a frequency domain resource indication for UE to feedback the CARP(s) associated with the CARQ.

In one example, the CARQ can be associated with measurement object configured by RRC parameter. In one example, the CARQ can be cell-specific. In another example, the CARQ can be UE-specific. In yet another example, the CARQ can be UE-group-specific. For instance, the CARQ can be beam-specific.

In one embodiment, CARQ is included as part of MAC CE and configured to a UE.

In one example, at least one of the following components (e.g., as a field in the MAC CE) is included: (1) a field indicating the beam direction(s) requiring the UE to sense, wherein the indication method is according to the mentioned examples/embodiments in the present disclosure; (2) a time domain resource allocation for UE to feedback the CARP(s) associated with the CARQ; and/or (3) a frequency domain resource indication for UE to feedback the CARP(s) associated with the CARQ.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system including a carrier operating with shared spectrum channel access, the BS comprising:

a processor configured to:
  determine a number of beam directions to sense;
  determine a number of channel access requests (CARQs) in a burst, wherein the number of CARQs is greater than one; and
  determine at least one field in a downlink control information (DCI) format, wherein the at least one field indicates:
    a set of CARQs according to the number of CARQs in the burst; and
    a set of beam directions according to the number of beam directions to sense; and
a transceiver operably coupled to the processor, the transceiver configured to transmit, to a user equipment (UE), the DCI format including the at least one field in physical downlink control channels (PDCCHs).

2. The BS of claim 1, wherein:
the transceiver is further configured to transmit a set of higher layer parameters indicating the number of beam directions to sense and the number of CARQs in the burst,
the number of beam directions to sense is equal to the number of CARQs in the burst, and
the number of CARQs in the burst corresponds to the number of beam directions to sense, respectively.

3. The BS of claim 1, wherein the processor is further configured to:
perform a channel access procedure before transmission of the DCI format in the PDCCHs over the carrier operating with the shared spectrum channel access, wherein the channel access procedure is performed based on a time duration with energy sensing on the carrier; and
determine to transmit only after the carrier is determined to be idle based on the channel access procedure.

4. The BS of claim 1, wherein the processor is further configured to:
determine a number of channel occupancy time (COT) durations; and
include, in the at least one field in the DCI format, information indicating a set of COT durations according to the number of COT durations.

5. The BS of claim 4, wherein:
the number of COT durations is indicated in a set of higher layer parameters,
the number of COT durations is equal to the number of beam direction to sense, and
the number of COT durations corresponds to the number of beam directions to sense, respectively.

6. The BS of claim 1, wherein the DCI format is one of:
a DCI format 1_0;
a DCI format 1_1;
a DCI format 1_2; or
a DCI format 2_0.

7. The BS of claim 1, wherein:
the transceiver is further configured to receive, from the UE, at least one channel access response (CARP), and
the CARP includes information on sensing results for a beam direction in the set of beam directions indicated in the DCI format.

8. A user equipment (UE) in a wireless communication system, the UE comprising:
a transceiver configured to receive, from a base station (BS), a downlink control information (DCI) format in physical downlink control channels (PDCCHs); and
a processor operably coupled to the transceiver, the processor configured to:
  determine a number of beam directions to sense;
  determine a number of channel access request (CARQs) in a burst, wherein the number of CARQs is greater than one; and
  determine, based on at least one field in the DCI format:
    a set of CARQs according to the number of CARQs in the burst; and
    a set of beam directions according to the number of beam directions to sense.

9. The UE of claim 8, wherein:
the transceiver is further configured to receive a set of higher layer parameters indicating the number of beam directions to sense and the number of CARQs in the burst,
the number of beam directions to sense is equal to the number of CARQs in the burst, and
the number of CARQs in the burst corresponds to the number of beam directions to sense, respectively.

10. The UE of claim 8, wherein the processor is further configured to:
determine a number of channel occupancy time (COT) durations; and
determine, based on the at least one field in the DCI format, a set of COT durations according to the number of COT durations.

11. The UE of claim 10, wherein:
the number of COT durations is indicated in a set of higher layer parameters,
the number of COT durations is equal to the number of beam direction to sense, and
the number of COT durations corresponds to the number of beam directions to sense, respectively.

12. The UE of claim 8, wherein the DCI format is one of:
a DCI format 1_0;
a DCI format 1_1;
a DCI format 1_2; or
a DCI format 2_0.

13. The UE of claim 8, wherein:
the transceiver is further configured to transmit, to the BS, at least one channel access response (CARP), and
the CARP includes information on sensing results for a beam direction in the set of beam directions indicated in the DCI format.

14. A method of operating a user equipment (UE) in a wireless communication system, the method comprising:
receiving, from a base station (BS), a downlink control information (DCI) format in physical downlink control channels (PDCCHs);
determining a number of beam directions to sense;
determining a number of channel access request (CARQs) in a burst, wherein the number of CARQs is greater than one; and
determining, based on at least one field in the DCI format:
  a set of CARQs according to the number of CARQs in the burst; and
  a set of beam directions according to the number of beam directions to sense.

15. The method of claim 14, further comprising:
receiving a set of higher layer parameters indicating the number of beam directions to sense and the number of CARQs in the burst,
wherein the number of beam directions to sense is equal to the number of CARQs in the burst, and
wherein the number of CARQs in the burst corresponds to the number of beam directions to sense, respectively.

16. The method of claim 14, further comprising:
   determining a number of channel occupancy time (COT) durations; and
   determining, based on the at least one field in the DCI format, a set of COT durations according to the number of COT durations.

17. The method of claim 16, wherein:
   the number of COT durations is indicated in a set of higher layer parameters,
   the number of COT durations is equal to the number of beam direction to sense, and
   the number of COT durations corresponds to the number of beam directions to sense, respectively.

18. The method of claim 14, wherein the DCI format is one of:
   a DCI format 1_0;
   a DCI format 1_1;
   a DCI format 1_2; or
   a DCI format 2_0.

19. The method of claim 14, further comprising:
   transmitting, to the BS, at least one channel access response (CARP),
   wherein the CARP includes information on sensing results for a beam direction in the set of beam directions indicated in the DCI format.

* * * * *